United States Patent [19]

Jorion et al.

[11] Patent Number: 4,928,088

[45] Date of Patent: May 22, 1990

[54] APPARATUS FOR EXTRACTING RECORDED INFORMATION FROM A LOGGING TOOL

[75] Inventors: Bruno Jorion; Christian Galiano, both of Houston; Peter Wraight, Missouri City, Tex.

[73] Assignee: Schlumberger Technology Corporation, Houston, Tex.

[21] Appl. No.: 321,708

[22] Filed: Mar. 10, 1989

[51] Int. Cl.[5] .............................................. G01V 1/00

[52] U.S. Cl. .................................... 340/854; 340/855; 175/40

[58] Field of Search ...................... 340/853, 854, 855; 175/40

[56] References Cited

U.S. PATENT DOCUMENTS

| | | | |
|---|---|---|---|
| 2,370,818 | 3/1945 | Silverman | 177/352 |
| 3,209,323 | 9/1965 | Grossman, Jr. | 340/18 |
| 3,550,682 | 12/1970 | Fowler | 166/0.6 |
| 4,544,035 | 10/1985 | Voss | 166/299 |
| 4,605,268 | 8/1986 | Meador | 340/854 |
| 4,736,204 | 4/1988 | Davison | 340/856 |
| 4,806,928 | 2/1989 | Veneruso | 340/856 |

*Primary Examiner*—Charles T. Jordan
*Assistant Examiner*—Charles T. Eldred
*Attorney, Agent, or Firm*—John J. Ryberg; Stephen L. Borst

[57] ABSTRACT

A communications system for providing communication between a downhole well logging apparatus and external equipment in which a portion of the external equipment is placed in an aperature in a side wall of the well logging and electromagnetic signals are exchanged.

11 Claims, 3 Drawing Sheets

APPARATUS FOR EXTRACTING RECORDED INFORMATION FROM A LOGGING TOOL

BACKGROUND OF THE INVENTION

The present invention relates to apparatus for communicating information through the sidewall of a logging tool. More specifically, the present invention relates to an apparatus for communicating recorded information through the sidewall of a drill collar which contains measurement while drilling apparatus such as a parameter sensor and a parameter recorder.

DESCRIPTION OF THE PRIOR ART

During the process of making measurements while a borehole is being drilled, a large amount of data may be generated by sensors mounted in and/or on a drill collar of the bottom hole assembly at the bottom of a drill string. Due to the well known limitations in data rate available in wireless telemetry systems which are conventionally employed during the drilling/logging operation, more data may be generated than can be delivered to the surface via the wireless telemetry system. Therefore, it has been known to provide downhole recorders for recording the data that cannot conveniently be sent to the surface in real time, for its later retrieval when the bottom hole assembly is returned to the surface for changing a worn bit or for other purposes.

One technique that has, for the most part, now become outmoded is the use of a replaceable recorder with batteries upon which the recorder depended. In order to recover the recorded information with that technique, the bottom hole assembly was disassembled when it reached the surface, the tool itself disassembled to recover the recorder, and a substitute recorded put in its place with fresh batteries. The tool and the bottom hole assembly were then reassembled before the drilling operation could be resumed.

With the development of long lifetime batteries and high density recorders which can be down loaded at the surface, the rather lengthy and cumbersome process of disassembling the bottom hole assemble is no longer necessary. Providing electrical connectors at the end of the drill collar through which the recorder could be downloaded, made the removal of the recorder unnecessary, but downloading the recorder through the drill collar still required the time consuming process of pulling the drill collars apart in order to permit end-wise access to an electrical plug.

In addressing the procedure for establishing communicator between the recorder which is interior to the drill collar and a computer memory which is external to the drill collar, U.S. Pat. No. 4,216,536 proposes a through-the-collar sidewall electrical connection as a means of avoiding the time consuming end-wise disassembly and reassembly of the drill collars. While the through-the-wall technique of U.S. Pat. No. 4,216,536 is a time saving improvement over the through-the-end of the drill collar technique, it is nonetheless, fraught with problems of its own. Primarily, the electrical connection through-the-wall is not intrinsically safe since any time there is an electrical connection to be made, there is the risk of drawing a spark capable of igniting the hydrocarbon gases commonly present at a well drilling site. The through-the-wall technique also poses the difficulty of maintaining a clean electrical connection despite the fact that as the electrical connector is being connected, grimy water or oil based drilling mud may be running down the side of the drill collar and into the open electrical socket provided for the purpose.

U.S. Pat. No. 4,736,204 seeks to overcome these difficulties by utilizing one of the data acquiring sensors of the tool for communicating the stored information. Specifically, in that patent it is proposed to utilize an electromagnetic wave transmitting antenna provided on the tool for making an electromagnetic propagation resistivity measurement as the means for transmitting the stored data to a receiving antenna device strapped to the exterior of the tool. While this is an interesting concept, the transmitting antenna of the electromagnetic propagation resistivity tool is not designed to transmit information efficiently. Furthermore, other investigation tools, such as a neutron porosity tool or a gamma density tool which may have their own recorders are not equipped with such a transmitting antenna so the it would not be possible to download their stored data if the electromagnetic propagation resistivity tool were not functioning or not present in the bottom hole assembly or if the nuclear tools and the electromagnetic propagation resistivity tool were separated one from the other so as to be out of electrical communication.

Thus it may be seen that an intrinsically safe, inexpensive yet efficient and effective communications link through the side wall of a measurement while drilling logging tool is needed to further facilitate the retrieval of valuable data stored downhole during the drilling process. Such a safe, inexpensive, efficient and effective communications link has been devised and will be described in detail below. Additionally, the communications link of the present invention is less apt to wear or to corrode.

SUMMARY OF THE INVENTION

An electromagnetic link through an aperture in the side of a logging device is provided for establishing a communications link between interior and exterior electronic systems. The communications link may be either magnetic or optical in nature. In the former, a coil is mounted on a magnetic material and a hermetic seal is established between the interior of the tool and the exterior of the tool. In the latter, a light emitting diode is provided in the sidewall of the tool and is driven by circuitry interior of the tool. In each case, complementary receiving elements are provided for responding to the coded electromagnetic information transmitted by the transmitter. In the case of the optical device, a photo-sensitive transistor may act as the receiver while in the case of the magnetic link, a similar electromagnetic coil may be utilized for converting the coded magnetic signal into an electrical signal.

DESCRIPTION OF THE PREFERRED EMBODIMENT

Figure 1:
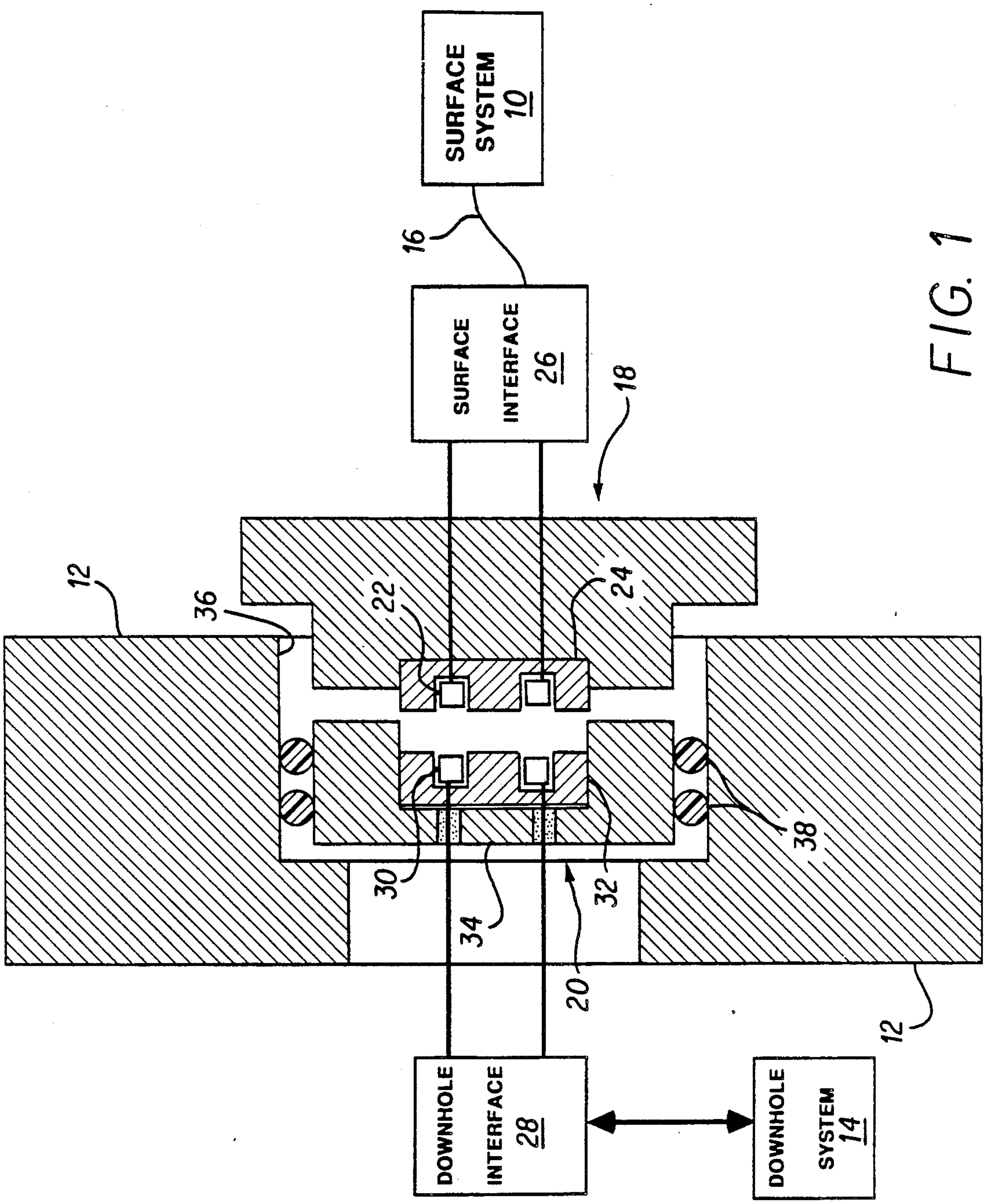
FIG. 1 is an illustration of a through the drill collar communication system according to the preferred embodiment of the invention.

Referring now to FIG. 1 there is illustrated the novel communications technique of the present invention. One of the objects of the invention is to bring into communication a surface situated computer or at least a surface situated recorder, the surface system (10), with an investigation tool (not shown) and/or recorder (also not shown) for storing the data generated by the investigation tool. The investigation tool and/or recorder, which are both located on the inside of a drill collar (12) in the case of a logging while drilling application or a tool housing in the case of a wireline sound, are designed to be lowered down into the well and will be referred to as the downhole system (14). The surface system, which is usually at a remote location from the drilling floor, is placed into communication with the downhole system via a cable (16). One end of this cable plugs into the serial communication port of the surface system (10), while the other end terminates in a external coupler (18) referred to as the "surface coupler".

The surface coupler (18) consists of a surface interface (26), to be further described below, and a surface coil winding (22) wound on a ferrite pot core (24). The surface coupler is provided with a clamp (not shown) which facilitates securing it to the drill collar (12) in its operative position. In such position, the surface coupler (18) is inserted into a receptacle referred to as the "downhole coupler" (20), located on the drill collar wall.

The downhole coupler consists of a bulkhead (34), seated in a aperture (36) in the drill collar wall (12) and sealed by the means of two "o" rings (38) or other satisfactory sealing means. Mounted on the bulkhead is a second ferrite pot core (32) around which is wound a second coil, the downhole coil winding (30). Electrical leads $a_1$ and $a_2$ from the coil traverse the bulkhead (34) through a pair of hermetic metal/glass feed troughs or other suitable feed throughs. Coils (22) and (30) may be potted in a groove in core (32) in any suitable rubber or epoxy to provide stabilization and protection of the coil against fluid intrusion and physical damage. During the time that the drill collar is performing its normal downhole operation of drilling a borehole, the recess 36 may be closed off with a cap and o-rings secured by a spring clip (not shown) which provides protection to the downhole coupler against the rather severe drilling environment.

When the two half cores (22) and (30) are juxtaposed to one another, they form a transformer which magnetically couples their respective windings. Accordingly, a coded signal fed to one of the coils is induced in the other of the coils, thereby establishing a magnetic communications link.

Figure 2:
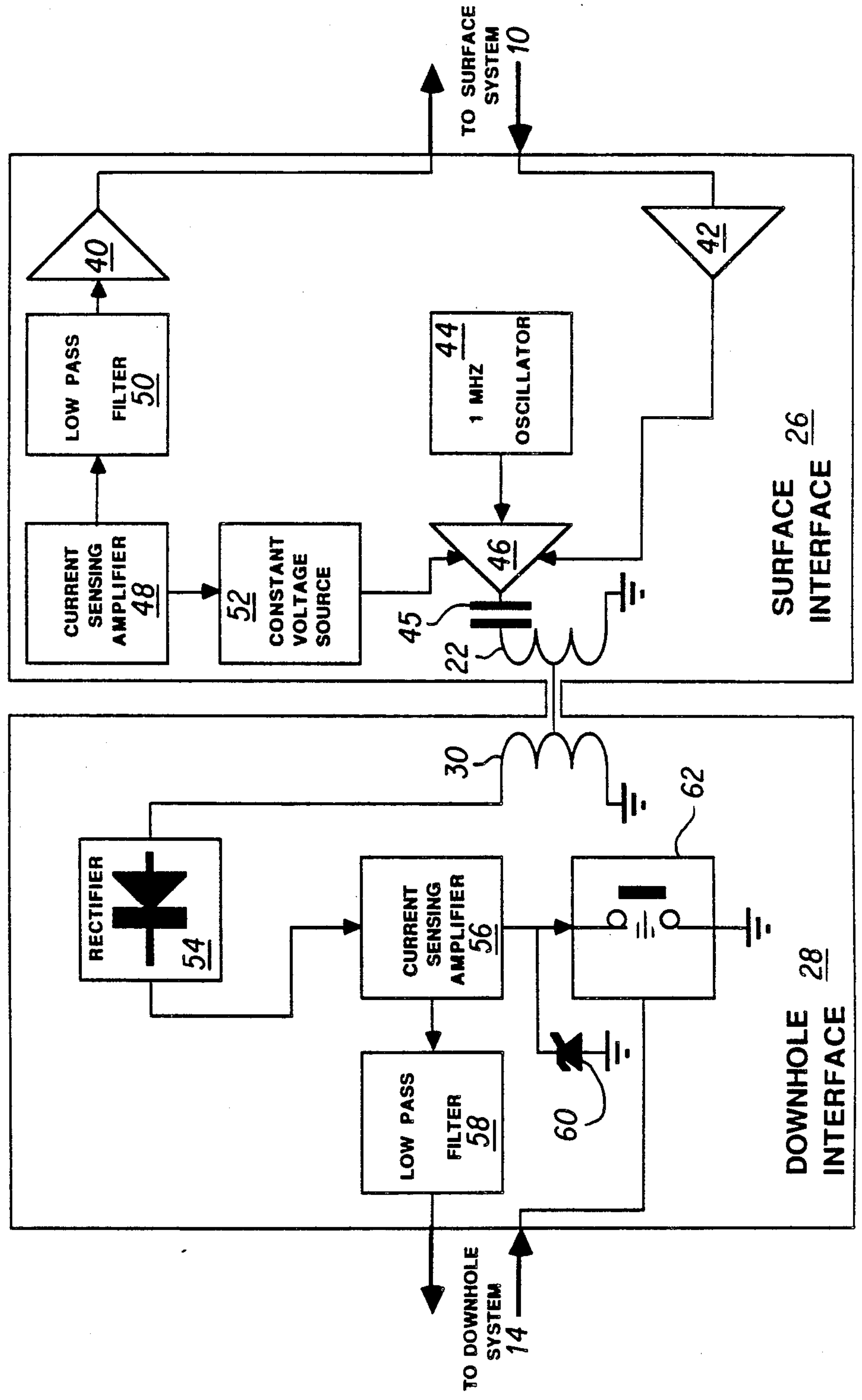
FIG. 2 is a block diagram illustration of the electronic circuitry included in the communications interfaces of the present invention.

Turning now to FIG. 2, there is shown in block diagram form the proposed electronic circuitry for practicing the invention. The surface interface (26) includes a cable signal receiver/conditioner (amplifier) (42) which receives, conditions and amplifies the digitally coded signal from surface system (10) via cable (16). Signals of the proper amplitude are hence provided to an exciting coil driving circuit or gated buffer (46) which is provided with a coil exciting current from a constant voltage power supply (52). Also connected to circuit (46) is a high frequency carrier signal generator (44) which imposes an oscillating square wave carrier signal having a frequency of approximately 1 Mhz on the exciting current. Gated buffer (46) passes a net modulated exciting current to the inductive coil (22) in the system's surface to downhole transmission mode through a decoupling capacitor (45) whenever a binary signal at logic level "1" is present at its gate and not otherwise. This serves to excite coil (22) with a pulsed high frequency carrier with the power being provided by the constant voltage source (52). A current sensing means (48) is provided for sensing the magnitude of the current from source (52). Current sensing means (48), which may be a current sensing amplifier, provides its properly amplified output to a low pass filtering circuit (50) and a cable driver amplifier (40).

The downhole interface (28) is provided to receive coded signals from and to provide coded signals to the downhole coupler coil (30). The downhole interface (28) includes a rectifier (54) connected on its one side to the coil (30) and on its other side to a current sensing means (56). Sensing means (56), which may also be a current sensing amplifier, in turn is connected to a low pass filtering circuit 58. Amplifier (56) is also connected to Zener diode (60) and to a electronic (static) switch (62) which receives and is controlled by coded signals from the downhole system (14). As can be seen, the opposite pole of the switch (62) is connected to ground so as to short circuit the Zener diode (60) when the switch is in its closed configuration.

With the above described systems, data are exchanged in the form of serial binary digits in a half duplex mode. Communication is accomplished with an amplitude modulation scheme for surface to downhole transmission and a load modulation scheme for downhole to surface transmission. This arrangement has the advantage of simplifying and minimizing the electronic equipment interior of the tool which must survive the abuse of downhole temperature and vibrations of the drilling process. Additionally, this arrangement has the advantage of minimizing power demand on the interior of the tool so that precious battery resources are preserved. The 1 Mhz carrier frequency used in the modulator allows one to obtain communication rates as high as 38,400 Bauds.

The process of communicating from the surface system (10) to the downhole system (14) will now be described. Such inward communication enables the surface system (10) to send commands to the downhole system or to supply information, such as calibration constants and desirable data frame configurations and new programming instructions, to the investigating equipment for its downhole operation. Switch (62) in the downhole interface (28) is normally in its closed position. The binary coded serial data provided by the surface system (10) are directed via amplifier (42) to the "output enable" gate of the exciting coil driver (46). When the gated buffer coil driver (46) is enabled with a signal of logic level 1, a current having a 1 Mhz continuous carrier wave is passed to the exciting coil (22) and hence to the loading coil (30) through magnetic fields linking the two coils. The current induced in coil (30) is permitted to flow after rectification to ground through closed switch (62). When the coil driver (46) is disabled (logic level 0), no current flows in the loading coil (22). The envelope of the loading coil current which reproduces the data coming from the surface system is restored by first rectifying at rectifier (54), and then sensing and amplifying at amplifier (56). This is followed by low pass filtering at filter (58) to completely restore the coded envelope.

The operation of the communications coupler in its other mode of operation will now be described. This mode of operation allows the downhole system to respond to surface system commands for transmitting data from the downhole system to the surface system and to down load data from a recorder that has recorded information about the formation drilled and/or other drilling information. In this mode of operation, the communication is conducted according to a load modulated scheme. The exciting coil driver (46) is continuously enabled so that coil (22) is continuously excited. The serial coded data from the downhole system (14) (the tool recorder) are provided as the enabling control signal to the switch (62). A logic level of 0 causes switch (62) to assume its closed state while a logic level of 1 causes switch (62) to assume its open configuration.

When static switch (62) is in its closed configuration, the effective power transmitted through coupling coils (22) and (30) is minimal since coil (30) is grounded through the switch (62) and sees no load. Thus the energy, with the exception of a slight amount of heat dissipated energy, remains stored in the coupling coils. When the switch (62) is open however, coil (30) experiences a load provided by Zener diode (60) of limited, constant voltage. In this condition, the transmitted power which develops across the Zener diode (60), is maximal. Since the mean output current passed by the exciting coil driver (46) is proportional to the transmitted power, the differences between switch (62) "open" and switch (62) "closed" are sensed by current sensing amplifier (48). The original coded envelope, which reproduces the serial coded data coming from the downhole system (14), may then be restored by proper amplification and filtering by the low pass filter (50) prior to its delivery to cable driver amplifier (40). In this manner, it is possible to provide two-way communication between the drill collar housed system and the surface system without requiring the drill collar housed system to carry an energy source for powering the communications link.

Figure 3:
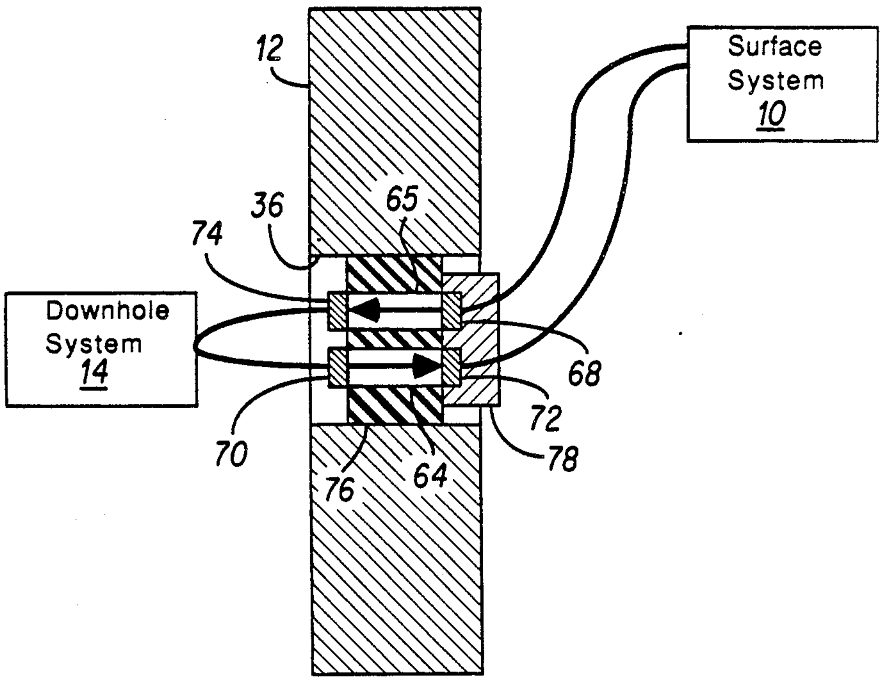
FIG. 3 is an illustration of an optical embodiment of the present invention.

Turning now to FIG. 3, there is illustrated an additional embodiment of the present invention in which the through-the-collar communications link is accomplished by means of an optical link. In this embodiment, a metal bulkhead (76) is provided in a passage which passes through the wall of the drill collar. The bulkhead is hermetically sealed by means of welding or suitable "o" ring seals as may be desired. Bulkhead (76) contains a pair of quartz or otherwise optically transparent windows (64) and (65) which may be fused to the material of the bulkhead. On the interior side of the bulkhead are positioned a light emitting diode (70) and a receiving photo-transistor (74) in registration with quartz windows (64) and (65) respectively. Light emitting diode, LED, (70) is interfaced to the downhole system (14) to permit coded data generated by the downhole system (14) to be transmitted to the LED for conversion into coded light pulses that are transmitted through the quartz window (64). For these purposes, downhole system (14) may include a microprocessor and a memory such that data stored in the memory may be coded and transmitted under the control of the microprocessor. Photo transistor (74) is interfaced with the downhole system (14) to enable coded signals, such as execute commands and reprogramming commands, to be transmitted to the downhole system (14).

During drilling operations, the exterior of the bulkhead (76) is protected against damage by means of a cap (not shown) which may be removably fixed in place, such as by means of a spring clip. When the instrumented drill collar is positioned at the drilling floor and it is desired to communicate between the downhole and the surface systems, the cap is removed and after the quartz windows have been satisfactorily cleaned, replaced with a holder (78) which may be clamped into juxtaposition with the light emitting diode (70) and a receiving photo-transistor (74). Holder (78) carries its own light emitting diode (68) and receiving photo transistor (72) and serves to hold light emitting diode (68) and receiving photo transistor (72) in registration with the quartz windows (65) and (64) respectively. LED (68) and photo transistor (72) in turn are in communication with surface system (10) to complete the telemetry link.

Thus coded information transmitted by surface system (10) to LED (68) is converted into coded light pulses which traverse the quartz window (65) to be received by receiving photo transistor (74) which in turn corverts the light pulses into coded electrical signals that are delivered to the downhole system (14) (the microprocessor). Conversely, coded information transmitted by downhole system (14) to LED (70) is converted into coded light pulses which traverse the quartz window (64) to be received by receiving photo transistor (72) which in turn converts the light pulses into coded electrical signals that are delivered to the surface system (10). In this manner, effective two way communication may be accomplished at a rapid rate and in an intrinsically safe manner.

What is claimed is:

1. A communications system for providing communication between equipment carried within a well logging apparatus having a longitudinal axis and a side wall with an aperture formed in said side wall, and equipment external to said logging apparatus, said system comprising: a. A means for transferring information through said aperture without passing current through an electrical contact through said aperture, said means comprising:

- a first portion in electrical communication with the logging apparatus equipment and mounted in said aperture; and
- a second portion in electrical communication with the external equipment and configured to be movably placed within said aperture in juxtaposition with said first portion.

2. A communications system as recited in claim 1 wherein said first and second portions include first and second inductive coils respectively.

3. A communications system as recited in claim 2 wherein each of said inductive coils is axially symmetrical with its axes of symmetry substantially perpendicular to said longitudinal axis of said well loggiing apparatus.

4. A communications system as recited in claim 1 wherein said communications system includes means in one of said first and second portions form providing a high frequency modulated carrier signal.

5. A communications system as recited in claim 4 wherein one of said first and second portions includes means for load modulating one of said inductive coils in response to coded signals.

6. A communications system as recited in claim 4 wherein one of said first and second portions includes means for amplitude modulating one of said inductive coils in response to coded signals.

7. A communications system as recited in claim 2 wherein said first and second inductive coils are mounted on magnetic cores.

8. A communications system as recited in claim 2 wherein said first and second inductive coils are mounted on ferrite cores.

9. A communications system as recited in claim 1 wherein said first and second portions include an optical transducer for converting one of electrical signals or light signals into the other.

10. A communications system as recited in claim 9 wherein said first portion includes an optically transparent window mounted in said aperture.

11. A communications system as recited in claim 10 wherein said first and second portions each include a light emitting diode and a photo sensitive transistor.

* * * * *